United States Patent
Zumberge et al.

(10) Patent No.: US 6,385,527 B1
(45) Date of Patent: May 7, 2002

(54) SYSTEM AND METHOD FOR CLOSED LOOP SPEED CONTROL FOR STOP AND GO APPLICATIONS

(75) Inventors: Jon T. Zumberge, Dayton, OH (US); Brian C. Schwartz, Sterling Heights; Kevin E. Shipp, Westland, both of MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/754,421

(22) Filed: Jan. 3, 2001

(51) Int. Cl.⁷ ................................................ B60T 8/00
(52) U.S. Cl. ............................ 701/91; 701/78; 701/93
(58) Field of Search .......................... 701/91, 93, 83, 701/84, 78; 180/170, 179

(56) References Cited

U.S. PATENT DOCUMENTS 6,044,321 A * 3/2000 Nakamura et al. ............ 701/96

\* cited by examiner

Primary Examiner—Tan Nguyen
(74) Attorney, Agent, or Firm—Scott A. McBain

(57) ABSTRACT

A system and method for closed loop speed control for stop and go applications allowing adaptive cruise control operation at low speeds below vehicle idle speed by use of traction control system braking. The system comprises: proportional controller to hold the vehicle speed at the desired vehicle speed; integral controller to reduce vehicle speed when the adaptive cruise control cuts off speed control; stopped controller to overcome static friction after a vehicle stop; open loop controller to hold the vehicle speed a set speed below the vehicle idle speed. The system also provides a switch to set the torque command to zero for large positive speed control errors, such as when the desired speed is above the vehicle idle speed, and a transition logic to provide a smooth transition between alternate control mode operation and speed control mode operation.

20 Claims, 6 Drawing Sheets

SYSTEM AND METHOD FOR CLOSED LOOP SPEED CONTROL FOR STOP AND GO APPLICATIONS

TECHNICAL FIELD

This invention relates generally to the field of braking control wherein the electrical data processing system or calculating computer is designed to maintain vehicle velocity at a specified value, and in particular, to a system and method for closed loop speed control for stop and go applications.

BACKGROUND OF THE INVENTION

Cruise control systems have become common on consumer and commercial vehicles, allowing drivers to select a desired speed and maintain the desired speed without the need to hold down the accelerator pedal. Such systems reduce driver stress and allow them to maintain greater attention to the road. Adaptive cruise control systems provide even greater convenience by monitoring the following distance to the vehicle ahead and adjusting the cruise control as the distance changes.

Although such control systems are available for high-speed operation, they are ineffective when substantial braking torque is required. One such situation is stop and go driving at low speeds, where the vehicle speed is often below the engine idle speed. Similarly, they are not effective for certain environmental conditions, such as a long or steep downhill grade.

Prior art speed control strategies provide braking torque using brake by wire, regenerative braking by the engine, or a combination of the two. Typically, the speed control algorithm is proportional control. While this approach may be acceptable for some applications, it does not allow for the stopping and starting of a vehicle in traffic and may result in irregular operation that is uncomfortable for the driver.

Accordingly, it would be desirable to have a system and method for closed loop speed control for stop and go applications that overcomes the disadvantages described.

SUMMARY OF THE INVENTION

One aspect of the invention provides a system for closed loop speed control for stop and go applications, comprising a proportional controller, an integral controller, and a summer. The proportional controller calculates a speed control error from the vehicle speed command and the actual vehicle speed and uses the speed control error to increase or decrease the braking torque applied. The integral controller integrates the speed control error after the adaptive cruise control system disables the speed control, increasing the braking torque applied. The summer combines controller outputs into a torque command that is sent to the traction control system.

Another aspect of the invention provides a stopped controller for reducing braking torque applied after the vehicle stops, overcoming the larger static friction.

Another aspect of the invention provides an open loop controller for supplying a feed forward torque command, corresponding to the vehicle speed command below vehicle idle speed.

Another aspect of the invention provides a switch for setting the torque command to zero for large positive speed control errors, indicating the vehicle speed command is above the vehicle idle speed.

Another aspect of the invention is a transition logic controller for ramping the torque command from the value used in an alternate operating mode and the value to be used in the speed control mode when shifting to the speed control mode.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 1:
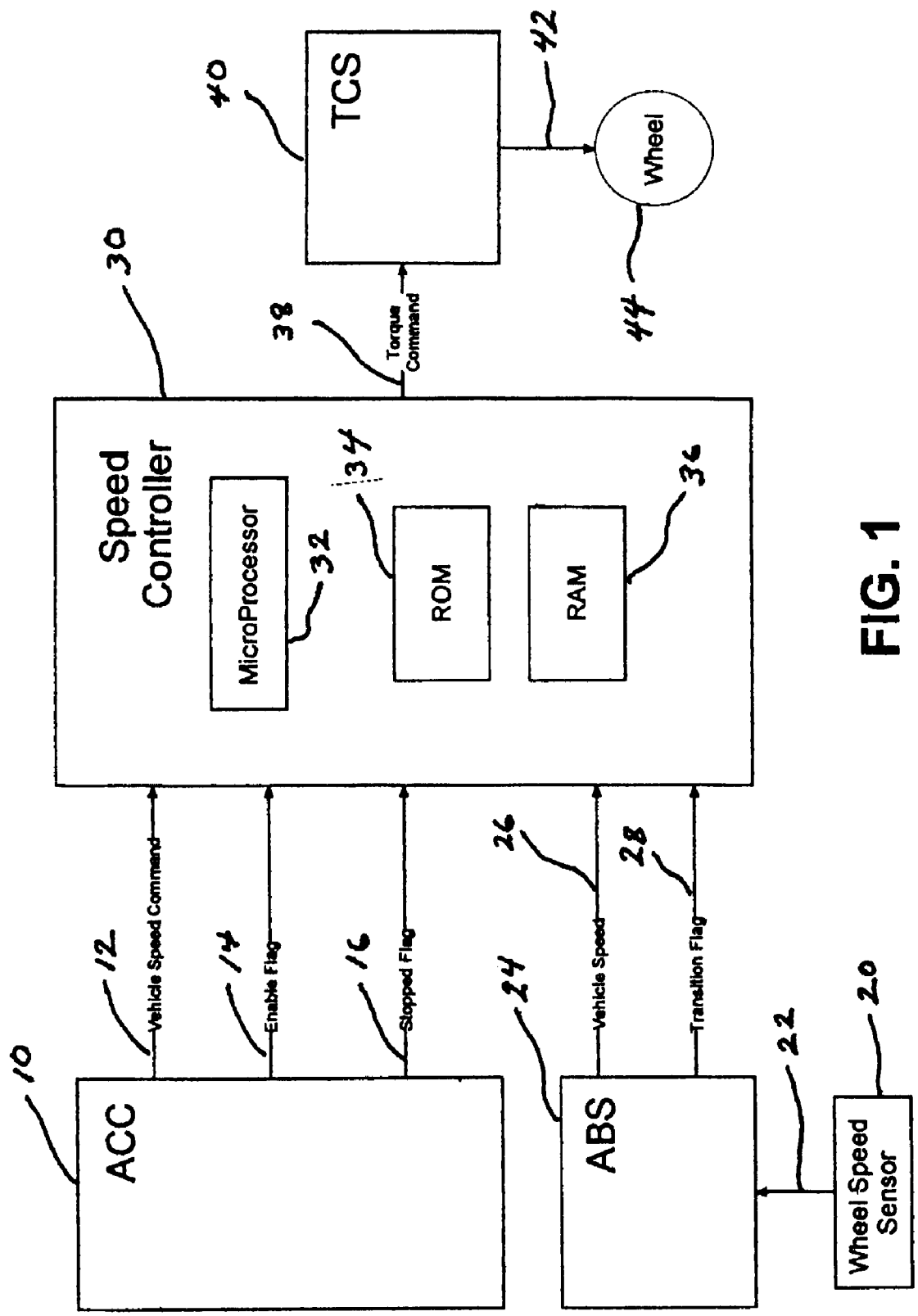
FIG. 1 is a block diagram of a preferred embodiment of a system for closed loop speed control for stop and go applications that is made in accordance with the invention.

FIG. 1 is a block diagram of a system for closed loop speed control for stop and go applications. Adaptive cruise control (ACC) 10 provides vehicle speed command 12, stopped flag 16, and enable flag 14 to speed controller 30. Adaptive cruise control 10 is a system for providing cruise control with a minimum of driver intervention once the driver selects the desired speed and uses measuring devices such as lasers or radar to measure and maintain a safe following distance behind another vehicle. Vehicle speed command 12 is a signal representing the desired speed as selected by the driver. Stopped flag 16 is a signal representing that the vehicle has stopped, derived from laser indication that the range to the vehicle ahead is not changing and the wheel speed sensors are no longer counting. Enable flag 14 is a control signal from the adaptive cruise control 10 instructing the speed controller 30 to cease speed control, such as when the measured vehicle following distance is decreasing.

Antilock braking system (ABS) 24 provides vehicle speed 26 and transition flag 28 to speed controller 30. Antilock braking system 24 receives wheel speed signal 22 from the wheel speed sensors 20 and controls vehicle braking. Vehicle speed 26 is a signal representing the measured vehicle speed. Transition flag 28 is a signal indicating that braking has been applied or removed.

Speed controller 30 may be a computer, microcomputer, or microprocessor, with ROM and RAM and appropriate input and output circuits. In one preferred embodiment, speed controller 30 is a microprocessor 32 with computer-readable storage media as read-only memory (ROM) 34 and random access memory (RAM) 36. The present invention is not limited to a particular type of processor or computer-readable storage medium, examples of which are provided for convenience of description only. Additional details of control logic implemented by speed controller 30 according to the present invention are provided with reference to FIGS. 2–8 below.

Speed controller 30 supplies torque command 38 to traction control system (TCS) 40, which is an automatic traction and braking system and may be part of antilock braking system 24. In one preferred embodiment, traction control system 40 is a conventional TCS modulator with a variable isolation valve. Traction control system 40 provides braking command 42 to wheel brake 44 to provide braking torque at the wheels.

Figure 2:
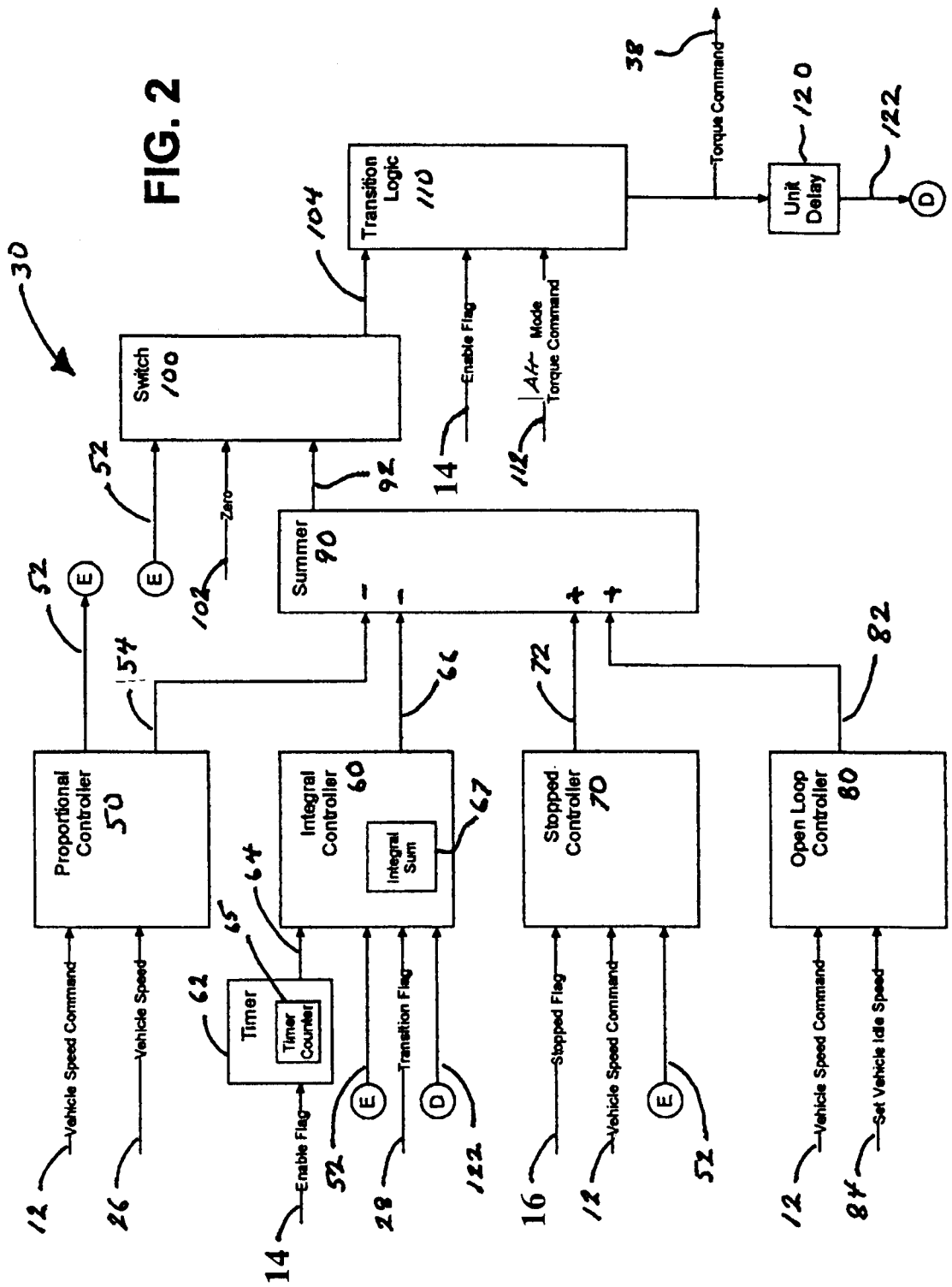
FIG. 2 is a block diagram of a preferred embodiment of a speed controller for stop and go applications that is made in accordance with the invention.

FIG. 2 is a block diagram of a speed controller for stop and go applications. Speed controller 30 provides proportional and integral control, as well as stopped control, open loop control, large positive error switching, and transition logic. While the proportional and integral control alone are sufficient to provide stop and go control, the additional elements improve operating performance. The functions of speed controller 30 may be carried out on a computer or microprocessor, or by conventional circuitry.

Proportional controller 50 processes vehicle speed command 12 and vehicle speed 26 to provide speed control error 52 and PC output 54. The proportional control adds or subtracts braking to hold the vehicle speed at the desired vehicle speed. PC output 54 is the same as speed control error 52 with gain applied. PC output 54 is provided to summer 90. Speed control error 52 is provided to switch 100, integral controller 60, and stopped controller 70. Additional details of control logic implemented by proportional controller 50 according to the present invention are provided with reference to FIG. 3 below.

Timer 62 having timer counter 65 supplies timer output 64 to integral controller 60. Timer 62 increments the timer counter 65 from zero when enable flag 14 changes to off until timer counter 65 reaches a maximum value of 255. Timer output 64 is the value of timer counter 65. The timer provides a delay between the time the enable flag changes to a not on state until the integral controller starts integrating, allowing for system transients and delays in the physical systems.

Unit delay 120 supplies delayed torque command 122 to integral controller 60. Delayed torque command 122 is torque command 38 from transition logic 110 delayed by unit delay 120.

Integral controller 60 having integral sum 67 processes timer output 64, speed control error 52, transition flag 28, and delayed torque command 122 to provide IC output 66 to summer 90. The integral control adds braking to reduce vehicle speed when the adaptive cruise control removes the speed control enable flag, such as when the vehicle following distance becomes too short. Additional details of control logic implemented by integral controller 60 according to the present invention are provided with reference to FIG. 4 below.

Stopped controller 70 processes stopped flag 16, vehicle speed command 12, and speed control error 52 to provide SC output 64 to summer 90. The stopped control reduces braking after the vehicle stops to overcome static friction, which is larger than rolling friction. Additional details of control logic implemented by stopped controller 70 according to the present invention are provided with reference to FIG. 5 below.

Open loop controller 80 processes vehicle speed command 12 and set vehicle idle speed 84 to provide OLC output 82 to summer 90. The open loop control provides baseline braking to hold the vehicle speed a set speed below the vehicle idle speed. Set vehicle idle speed 84 is calibrateable according to the idle speed of a particular vehicle or vehicle model. Additional details of open loop logic implemented by open loop controller 80 according to the present invention are provided with reference to FIG. 6 below.

Summer 90 adds PC output 54, IC output 64, SC output 64, and OLC output 82 to produce summer output 92. In typical operation, summer output 92 passes through switch 100 and transition logic 110 unchanged and is equivalent to torque command 38.

Switch 100 processes speed control error 52, zero 102, and summer output 92 to provide switch output 104 to transition logic 110. Switch 100 sets the torque command 38 to zero for large positive speed control errors 52, such as when the desired speed is above the vehicle idle speed. Additional details of open loop logic implemented by switch 100 according to the present invention are provided with reference to FIG. 7 below.

Transition logic 110 processes switch output 104, enable flag 14, and alternate mode torque command 112 to provide torque command 38 to the traction control system (FIG. 1) and unit delay 120. Transition logic 110 provides a smooth, ramped transition between operating in an alternate control mode and operating in the speed control mode. Additional details of transition logic implemented by transition logic 110 according to the present invention are provided with reference to FIG. 8 below.

Only the proportional control of proportional controller 50 and the integral control of integral controller 60 are required to provide closed loop speed control for stop and go applications. The additional elements, such as stopped control from stopped controller 70, open loop control from open loop controller 80, positive error control from switch 100, or transition smoothing from transition logic 110, may be added individually, in combination, or omitted. If switch 100 and transition logic 110 are omitted, summer output 92 may be output directly as torque command 38. If switch 100 is included, but transition logic 110 is omitted, summer output 92 may be output directly as torque command 38. Likewise, if transition logic 110 is included, but switch 100 is omitted, summer output 92 may provide the input to transition logic 110 provided by switch output 104 if the switch were included.

Figure 3:
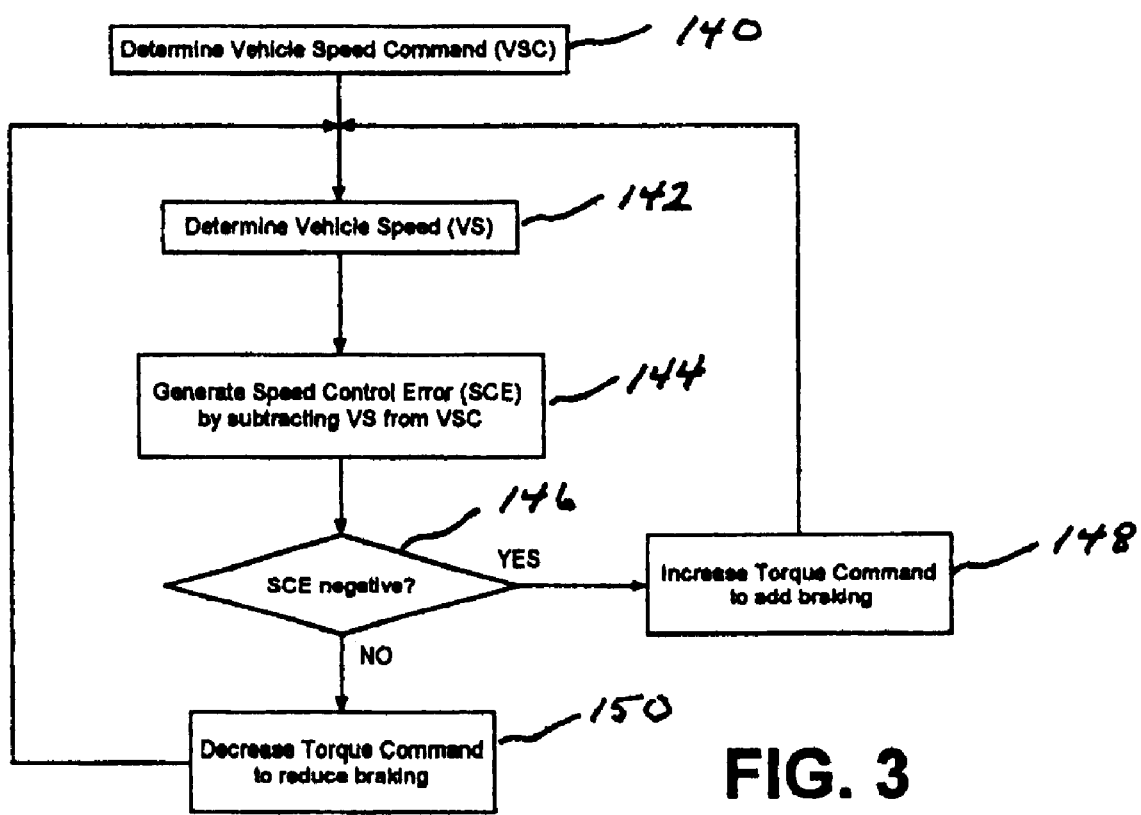
FIG. 3 is a flow chart of a preferred embodiment of a method of proportional control that is performed in accordance with the invention.

FIG. 3 is a flow chart of a method of proportional control that is performed in accordance with the invention. Because the vehicle is operating below the vehicle idling speed, braking is required for cruise control. The proportional control uses the difference between the vehicle speed command, representing the desired speed, and the actual vehicle speed to apply or release the brakes and make the vehicle speed command and actual vehicle speed equal.

The method of proportional control comprises the steps of determining a vehicle speed command (140); determining a vehicle speed (142); generating a speed control error (SCE) by subtracting the vehicle speed from the vehicle speed command (144); determining whether the speed control error is negative (146); increasing a torque command to add braking if the speed control error is negative (148); decreasing the torque command to reduce braking if the speed control error is not negative (150); and returning to the step 142 of determining the vehicle speed.

Figure 4:
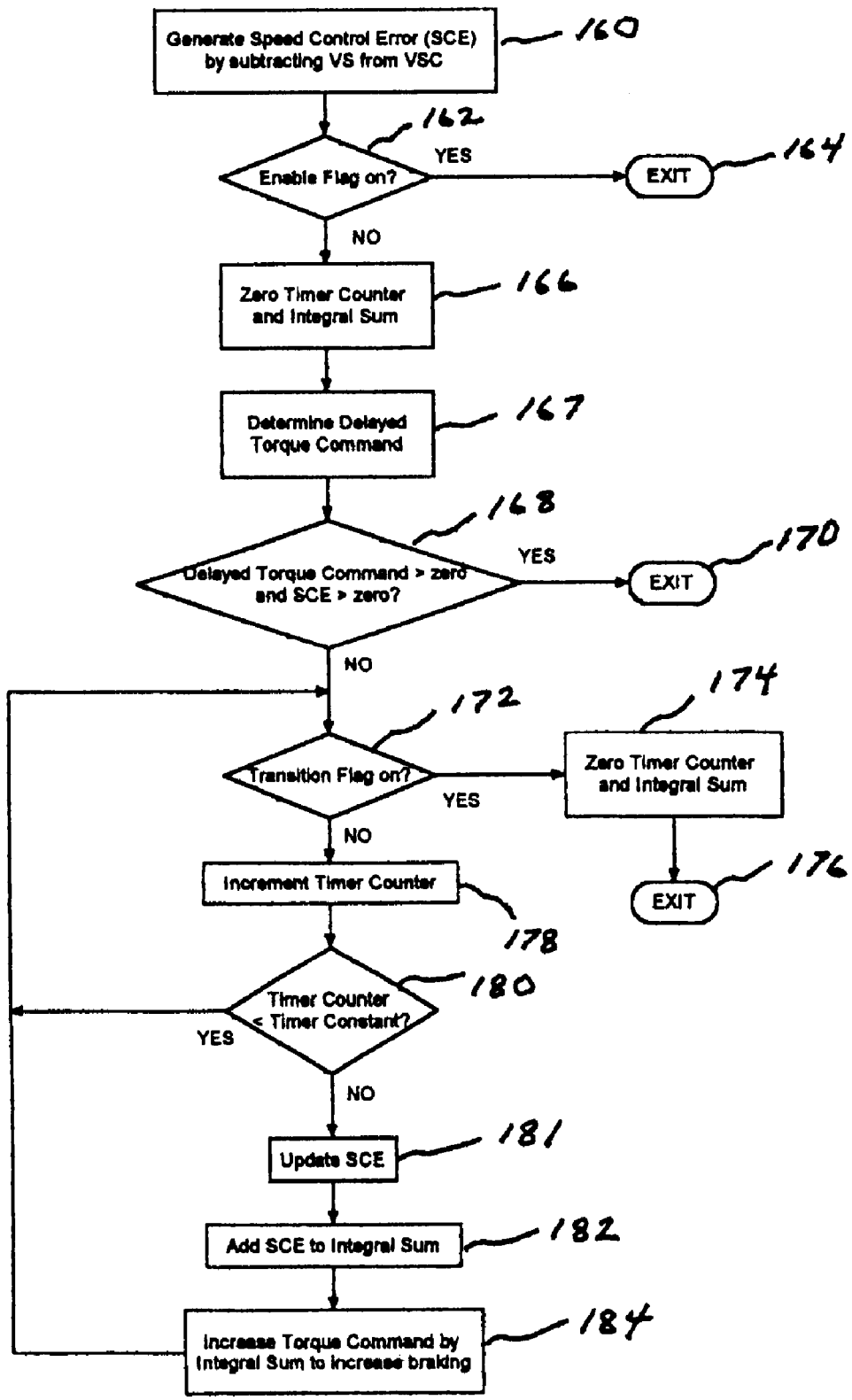
FIG. 4 is a flow chart of a preferred embodiment of a method of integral control that is performed in accordance with the invention.

FIG. 4 is a flow chart a method of integral control that is performed in accordance with the invention. The integral control integrates the speed control errors to add braking when the adaptive cruise control removes the enable flag for speed control. The method of integral control comprises the steps of generating a speed control error (SCE) by subtracting a vehicle speed (VS) from a vehicle speed command (VC) (160); determining whether an enable flag is on (162); exiting integral control if the enable flag is on (164); zeroing a timer counter and an integral sum if the enable flag is not on (166); determining whether a delayed torque command and the speed control error are both greater than zero (168); exiting integral control if the delayed torque command and the speed control error are both greater than zero (170); determining whether a transition flag is on (172); zeroing the timer counter and the integral sum (174) and exiting integral control (176) if the transition flag is on; incrementing the timer counter if the transition flag is not on (178); determining whether the timer counter is less than a timer constant (180); returning to the step 172 of determining whether the transition flag is on if the timer counter is less than a timer constant (180); adding the speed control error to the integral sum if the timer counter is less than a timer constant (182); increasing a torque command by the integral sum to add braking and returning to the step 184 of determining whether the transition flag is on. The timer counter applies a delay before the vehicle speed error integration starts to avoid transients and allow for physical system delays. The stored value of the integral sum is reset to zero upon a transition as indicated by the transition flag.

Figure 5:
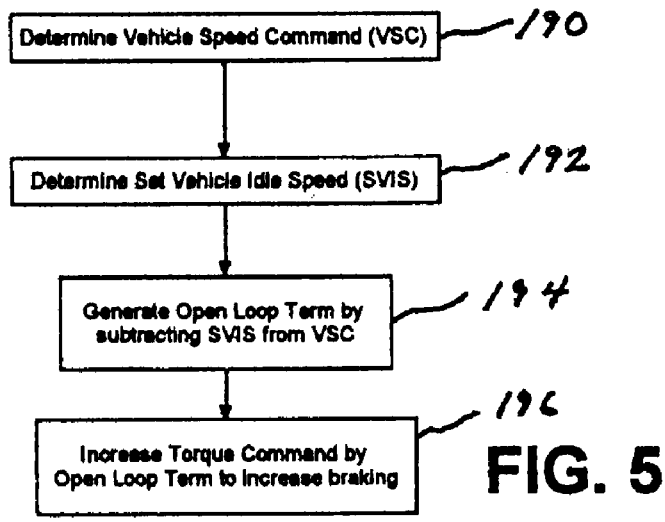
FIG. 5 is a flow chart of a preferred embodiment of a method of open loop control that is performed in accordance with the invention.

FIG. 5 is a flow chart of a method of open loop control that is performed in accordance with the invention. Open loop control provides a feed forward term that is the gain on the error between the vehicle speed command and set vehicle idle speed. The method of open loop control comprises the steps of determining a vehicle speed command (190); determining a set vehicle idle speed (192); generating an open loop term by subtracting the set vehicle idle speed from the vehicle speed command (194); and increasing a torque command by the open loop term to add braking (196).

Figure 6:
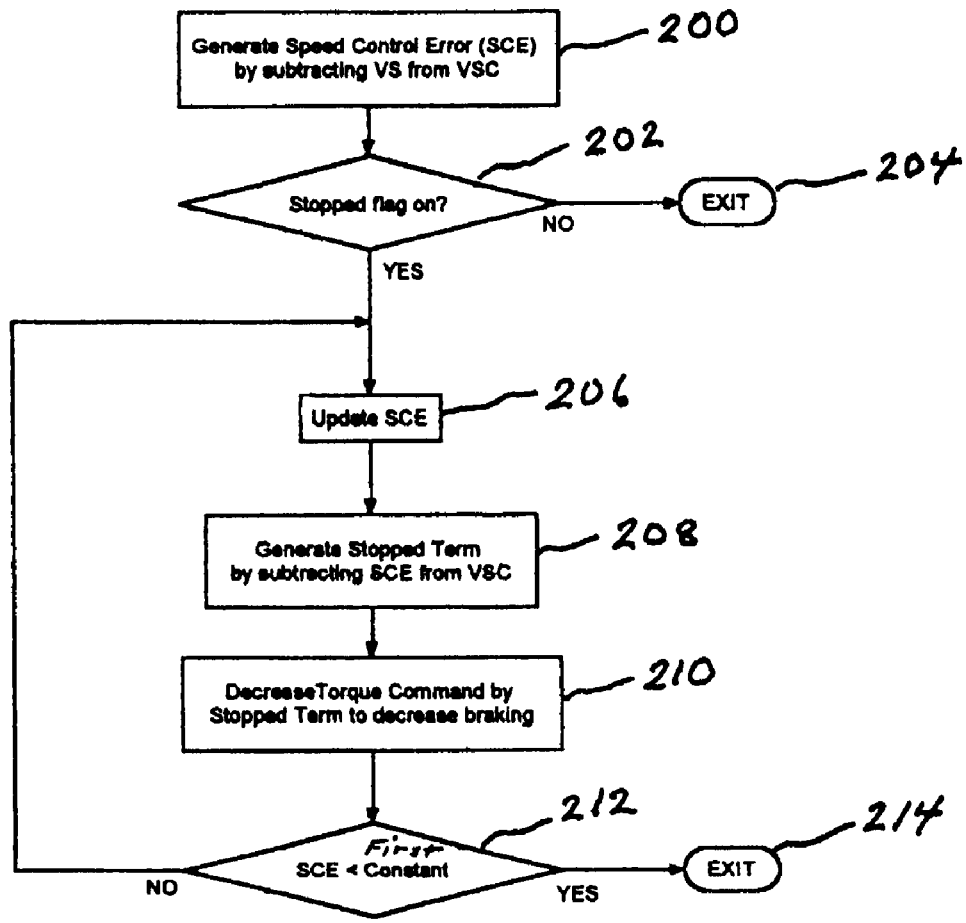
FIG. 6 is a flow chart of a preferred embodiment of a method of stopped control that is performed in accordance with the invention.

FIG. 6 is a flow chart a method of stopped control that is performed in accordance with the invention. The stopped control allows for continuation of tracking if tracking previously was 0 kph. This occurs by subtracting braking torque from the brakes while the vehicle is stopped until the vehicle resumes movement and slowly adding this subtracted torque back in. The method of stopped control comprises the steps of determining whether a stopped flag is on (202); exiting stopped control if the stopped flag is on (204); generating a speed control error (SCE) by subtracting a vehicle speed (VS) from a vehicle speed command (VC) (206); generating a stopped term by subtracting the speed control error from the vehicle speed command (208); decreasing a torque command by the stopped term to decrease braking (210); determining whether the speed control error is less than a constant (212); returning to the step 206 of generating a speed control error by subtracting a vehicle speed from a vehicle speed command if the speed control error is less than a constant (212); and exiting stopped control if the speed control error is not less than a constant (212).

Figure 7:
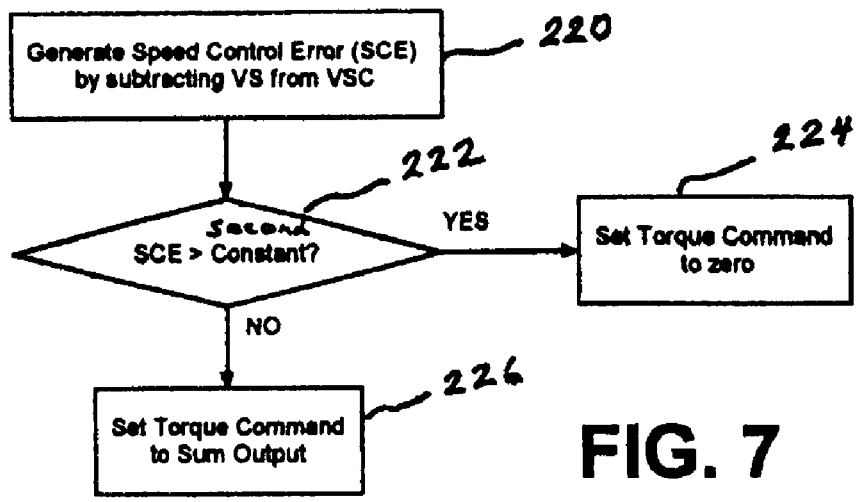
FIG. 7 is a flow chart of a preferred embodiment of a method of positive error control that is performed in accordance with the invention.

FIG. 7 is a flow chart of a method of positive error control that is performed in accordance with the invention. Positive error control sets the torque command to zero for large positive speed control errors, such as when the desired speed is above the vehicle idle speed. The method of positive error control comprises the steps of generating a speed control error (SCE) by subtracting a vehicle speed (VS) from a vehicle speed command (VC) (220); determining whether the speed control error is greater than a constant (222); setting a torque command to zero if the speed control error is greater than the constant (224); and setting the torque command to zero if the speed control error is not greater than the constant (224).

Figure 8:
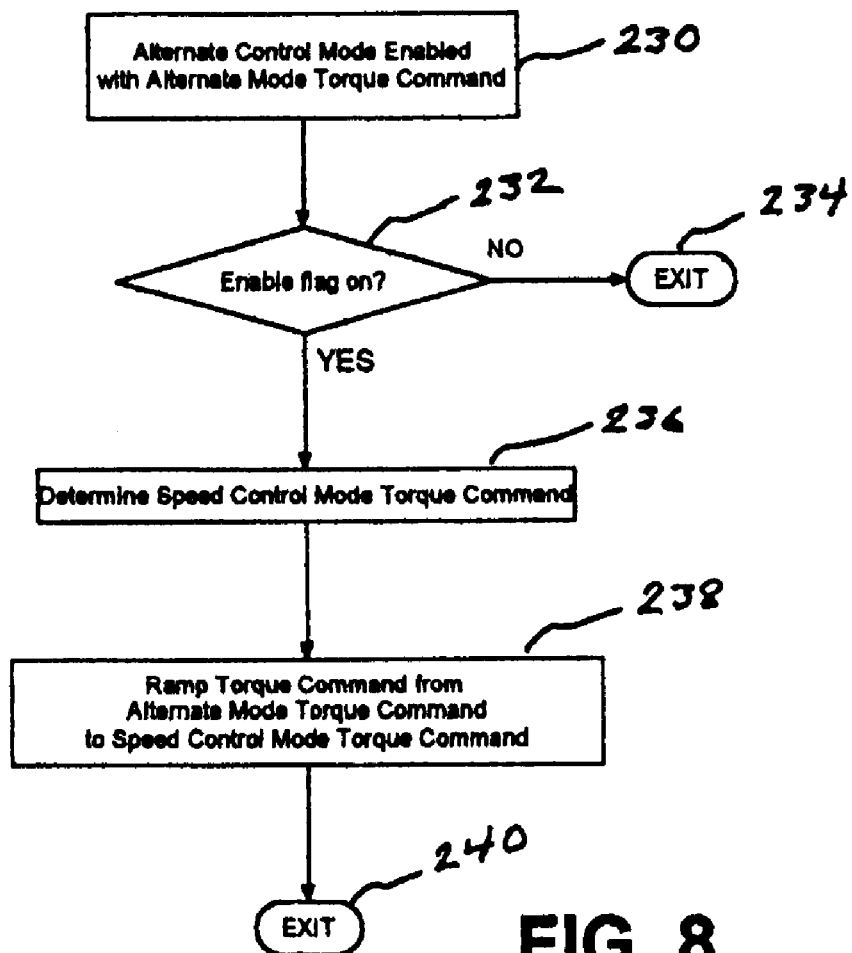
FIG. 8 is a flow chart of a preferred embodiment of a method of transition control that is performed in accordance with the invention.

FIG. 8 is a flow chart of a method of transition control that is performed in accordance with the invention. Transition control allows a smooth transition between alternate operating modes and the speed control mode. The method of transition control comprises the steps of operating in an alternate control mode with an alternate mode torque command (230); determining whether an enable flag is on (232); exiting transition control if the enable flag is not on (234); determining a speed control mode torque command if the enable flag is on (236); ramping the torque command from the alternate mode torque command to the speed control mode torque command (238); and exiting transition control (240).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system of closed loop speed control for stop and go applications, responsive to an adaptive cruise control system and an anti-lock braking system, and supplying braking control to a traction control system, comprising:

a proportional controller responsive to a vehicle speed command from the adaptive cruise control system and a vehicle speed from the anti-lock braking system and generating a speed control error and a PC output;

a timer responsive to an enable flag from the adaptive cruise control system and generating a timer output;

a unit delay responsive to a torque command and generating a delayed torque command;

an integral controller responsive to the timer output, the speed control error, a transition flag from the anti-lock braking system, and the delayed torque command and generating an IC output;

a summer responsive to PC output and IC output and generating a summer output, and means for transmitting the summer output to the torque command and supplying the torque command to the traction control system.

2. The system of claim 1 further comprising:

an open loop controller responsive to the vehicle speed command, and a set vehicle idle speed, and generating an OLC output; and wherein the summer is further responsive to the OLC output.

3. The system of claim 1 further comprising:

a stopped controller responsive to a stopped flag from the adaptive cruise control system, the vehicle speed command, and the speed control error, and generating an SC output; and wherein the summer is further responsive to the SC output.

4. The system of claim 1 wherein the transmitting means comprises a switch responsive to the speed control error, a zero, and the summer output, and generating a switch output as the torque command.

5. The system of claim 1 wherein the transmitting means comprises a transition logic responsive to the summer output, the enable flag, and an alternate mode torque command, and generating the torque command.

6. The system of claim 1 wherein the transmitting means comprises:
 a switch responsive to the speed control error, a zero, and the summer output, and generating a switch output; and
 a transition logic responsive to the switch output, the enable flag, and an alternate mode torque command, and generating the torque command.

7. A method of closed loop speed control for stop and go applications, comprising the steps of:
 determining a vehicle speed command;
 determining a vehicle speed;
 generating a speed control error by subtracting the vehicle speed from the vehicle speed command;
 determining whether the speed control error is negative;
 increasing a torque command to add braking if the speed control error is negative;
 decreasing the torque command to reduce braking if the speed control error is not negative;
 determining whether an enable flag is on;
 returning to the step of determining a vehicle speed if the enable flag is on;
 zeroing a timer counter and an integral sum if the enable flag is not on;
 determining a delayed torque command from the torque command;
 determining whether the delayed torque command and the speed control error are both greater than zero;
 returning to the step of determining a vehicle speed if the delayed torque command and the speed control error are both greater than zero
 determining whether a transition flag is on;
 zeroing the timer counter and the integral sum if the transition flag is on;
 returning to the step of determining a vehicle speed if the transition flag is on;
 incrementing the timer counter if the transition flag is not on;
 determining whether the timer counter is less than a timer constant;
 returning to the step of determining whether a transition flag is on if the timer counter is less than a timer constant;
 updating the speed control error using the current value of the vehicle speed;
 adding the speed control error to the integral sum if the timer counter is less than a timer constant;
 increasing the torque command by the integral sum to add braking; and
 returning to the step of determining whether a transition flag is on.

8. The method of claim 7 wherein the vehicle speed command is less than the vehicle idle speed.

9. The method of claim 7 wherein the vehicle speed command is 0 to 15 kilometers per hour.

10. The method of claim 7 further comprising the steps of:
 determining a set vehicle idle speed;
 generating an open loop term by subtracting the set vehicle idle speed from the vehicle speed command; and
 increasing the torque command by the open loop term to add braking.

11. The method of claim 7 further comprising the steps of:
 determining whether a stopped flag is on;
 returning to the step of determining a vehicle speed if the stopped flag is on;
 updating the speed control error using the current value of the vehicle speed;
 generating a stopped term by subtracting the speed control error from the vehicle speed command;
 decreasing the torque command by the stopped term to decrease braking;
 determining whether the speed control error is less than a first constant;
 returning to the step of updating the speed control error using the current value of the vehicle speed if the speed control error is less than the first constant; and
 returning to the step of determining a vehicle speed if the speed control error is not less the first constant.

12. The method of claim 7 further comprising the steps of:
 determining whether the speed control error is greater than a second constant; and
 setting the torque command to zero if the speed control error is greater than the second constant.

13. The method of claim 7 further comprising the steps of:
 operating in an alternate control mode with an alternate mode torque command;
 determining whether the enable flag is on;
 determining a speed control mode torque command if the enable flag is on; and
 ramping the torque command from the alternate mode torque command to the speed control mode torque command.

14. A computer readable medium storing a computer program for closed loop speed control for stop and go applications, said computer program comprising:
 computer readable code for determining a vehicle speed command;
 computer readable code for determining a vehicle speed;
 computer readable code for generating a speed control error by subtracting the vehicle speed from the vehicle speed command;
 computer readable code for determining whether the speed control error is negative;
 computer readable code for increasing a torque command to add braking if the speed control error is negative;
 computer readable code for decreasing the torque command to reduce braking if the speed control error is not negative;
 computer readable code for determining whether an enable flag is on;
 computer readable code for returning to the step of determining a vehicle speed if the enable flag is on;
 computer readable code for zeroing a timer counter and an integral sum if the enable flag is not on;
 computer readable code for determining a delayed torque command from the torque command;
 computer readable code for determining whether the delayed torque command and the speed control error are both greater than zero;

computer readable code for returning to the step of determining a vehicle speed if the delayed torque command and the speed control error are both greater than zero;

computer readable code for determining whether a transition flag is on;

computer readable code for zeroing the timer counter and the integral sum if the transition flag is on; and computer readable code for returning to the step of determining a vehicle speed if the transition flag is on;

computer readable code for incrementing the timer counter if the transition flag is not on;

computer readable code for determining whether the timer counter is less than a timer constant;

computer readable code for returning to the step of determining whether a transition flag is on if the timer counter is less than a timer constant;

computer readable code for updating the speed control error using the current value of the vehicle speed;

computer readable code for adding the speed control error to the integral sum if the timer counter is less than a timer constant;

computer readable code for increasing the torque command by the integral sum to add braking; and computer readable code for returning to the step of determining whether a transition flag is on.

15. The computer readable medium of claim 14 wherein the vehicle speed command is less than the vehicle idle speed.

16. The computer readable medium of claim 14 wherein the vehicle speed command is 0 to 15 kilometers per hour.

17. The computer readable medium storing the computer program of claim 14, the computer program further comprising:

computer readable code for determining a set vehicle idle speed;

computer readable code for generating an open loop term by subtracting the set vehicle idle speed from the vehicle speed command; and computer readable code for increasing the torque command by the open loop term to add braking.

18. The computer readable medium storing the computer program of claim 14, the computer program further comprising:

computer readable code for determining whether a stopped flag is on;

computer readable code for returning to the step of determining a vehicle speed if the stopped flag is on;

computer readable code for updating the speed control error using the current value of the vehicle speed;

computer readable code for generating a stopped term by subtracting the speed control error from the vehicle speed command;

computer readable code for decreasing the torque command by the stopped term to decrease braking;

computer readable code for determining whether the speed control error is less than a first constant;

computer readable code for returning to the step of updating the speed control error using the current value of the vehicle speed if the speed control error is less than the first constant; and computer readable code for returning to the step of determining a vehicle speed if the speed control error is not less the first constant.

19. The computer readable medium storing the computer program of claim 14, the computer program further comprising:

computer readable code for determining whether the speed control error is greater than a second constant; and computer readable code for setting the torque command to zero if the speed control error is greater than the second constant.

20. The computer readable medium storing the computer program of claim 14, the computer program further comprising:

computer readable code for operating in an alternate control mode with an alternate mode torque command;

computer readable code for determining whether the enable flag is on;

computer readable code for determining a speed control mode torque command if the enable flag is on; and computer readable code for ramping the torque command from the alternate mode torque command to the speed control mode torque command.

\* \* \* \* \*